United States Patent Office 3,293,227
Patented Dec. 20, 1966

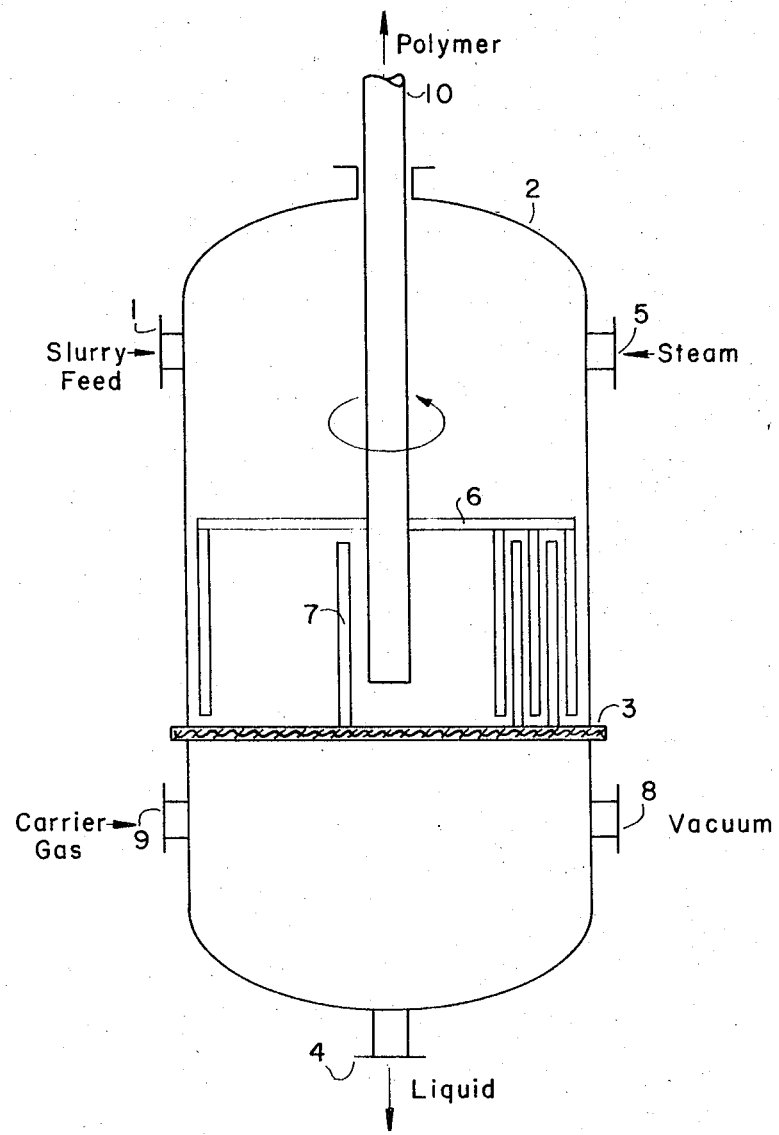

3,293,227
RECOVERY OF POLYMERS FROM SLURRIES
Henry F. Boggess and Jerome C. Wrobleski, Texas City, Tex., assignors to Monsanto Company, a corporation of Delaware
Filed Jan. 7, 1963, Ser. No. 249,778
10 Claims. (Cl. 260—88.2)

The present invention relates to a process for the separation of solids from liquids. More particularly, it relates to an improved method for separating solid polymers from a slurry of polymer and liquid. In another aspect, the invention relates to a novel apparatus for the recovery of polymers from a slurry containing said polymers.

Many polymers are obtained as a granular material suspended in a liquid medium from which the granular polymer must be separated and dried free from all liquid to obtain the polymer in a form suitable for further use.

A very valuable class of polymers obtained in slurry form; that is, as solid granular material suspended in a liquid, is the solid polymers of olefins, particularly ethylene polymers and propylene polymers. Many polymerization processes result in the formation of a polymer slurry at some point in the process. For example, where the polymerization is carried out in the liquid phase using a hydrocarbon carrier and a catalyst of chromium oxide supported on a solid vehicle, the catalyst is first separated from the polymer slurry and the polymer then precipitated by various methods, such as by external cooling, vacuum flashing, dispersion in water, stripping with steam, or the like. The resulting product is a slurry of the solid polymer in either a hydrocarbon diluent or water medium.

In another olefin polymerization process, the polymerization is carried out at low pressures and temperatures in liquid phase using a fluid or diluent as the liquid reaction medium to yield high molecular weight polymers. This process has been made possible through the agency of a type of catalyst commonly termed Ziegler-type catalyst which produces polymers commonly referred to as linear or sterospecific polymers. Many variations of the catalyst have been disclosed but the preferred group is prepared by the interaction of an aluminum alkyl with a compound of a metal of group IV–B, V–B or VI–B of the periodic table. The organo-metallic catalyst is removed by treatment with an oxygenated compound, such as an alcohol, to yield a polymer slurry from which the polymer may be precipitated out as a solid material in a liquid medium. Thus, the final polymer recovery step involves separation of the granular polymer from a hydrocarbon slurry containing said polymer.

Polyolefins, particularly polyethylene and copolymers of ethylene and other copolymerizable monomers, are also produced in a slurry form at high pressures and temperatures. This process can be conducted in either an autoclave type reactor or a tubular reactor. In either case, a monomer, ethylene, for instance, is mixed with a fluid medium such as benzene and water, catalyst such as oxygen is mixed with water and introduced into the ethylene mixture and the entire stream is pumped into the autoclave or tubular reactor at high pressures. After heating to the initiation temperature, the polymerization takes place and a slurry of polymer, unreacted monomer, benzene and water is withdrawn from the reactor. In one known process, the mixture leaving the reactor passes through a pressure let-down valve into a product separator at substantially atmospheric pressure where the unreacted ethylene and solvent are removed as vapors. The polymer is precipitated in the presence of water and the resulting slurry of ethylene polymer in water is discharged from the separator into an extruder in which the polymer is compacted, the water being forced out and discarded. Besides the usual difficulties of removing the water from the polymer, residual hydrocarbon carrier also creates an undesirable situation and removal of this carrier is always quite difficult.

In the usual Ziegler-type polymerization process to which the present invention is particularly applicable, the catalyst is suspended in a suitable liquid organic medium or carrier and the polymerizable olefin is bubbled through the system at a temperature anywhere in the range of 0° C. to about 100° C. Upon completion of the reaction, the polymer can be recovered from the total reaction mixture by a wide variety of procedures chosen in accordance with the properties of the particular polymer, the carrier present, and the like. Usually the first step is the destruction of the catalyst by quenching it with an alcohol. It is then generally quite desirable to remove as much catalyst from the polymer as possible, and this is conveniently done by washing the total reaction mixture with additional quench alcohol, usually an aliphatic alcohol having from 1 to 8 carbon atoms such as methanol, isopropanol, n-propanol, isobutanol, secondary butanol, or by various other procedures. The polymer-carrier slurry is recovered from the alcohol-catalyst phase and the insoluble polymer can then be separated from the carrier by filtration, centrifuging or other suitable physical separation procedures. Of course, any carrier present can also be separated from polymer by evaporation provided care is taken to avoid subjecting the polymer to too high a temperature. Such drying step is desirably effected by flash drying at moderate temperatures, below the softening point of the polymer or about 160° C. for polypropylene and 120° C. for polyethylene. After drying, the polymer must be densified and pelletized by some means usually by extrusion and conveyed to a packaging area.

In the Ziegler process and in other processes for the production of olefin polymers, the separation and recovery of solid polymers from liquid admixtures containing the same is difficult and expensive. The particles of polymers tend to adhere together to form agglomerates or lumps of polymer, particularly as the liquid is removed, and thereby greatly impede the further processing of the polymer. Also, agglomerates or lumps contain an occluded solvent which is not readily removed by heat or striping with an inert gas. Furthermore, the sticky polymer from which the liquid has been removed cannot be readily conveyed to the subsequent densification and pelletization steps.

In the preferred method for the separation and recovery of olefin polymers from slurries containing the same, the steps of filtering of the polymer from the liquid of the slurry, removing or displacing the liquid adsorbed on the surface of the polymer, and drying the polymer are ordinarily conducted separately, resulting in extremely high processing costs.

It has now been discovered that granular solids, particularly polymers, can be readily separated from liquid admixtures containing the same by subjecting the mixtures containing the granular solids to a mechanical agitation treatment while sequentially filtering, removing adsorbed liquid, and drying the solids in a single vessel.

It is, therefore, the object of this invention to provide a method and an apparatus for separating granular solids from liquids containing said solids. A further object of this invention is to provide a method and apparatus for reducing the agglomeration of granular solid polymers in the separation of said polymers from the liquid in a slurry containing the same. Still another object of this invention is to provide a method and apparatus for separating granular solid polymers from a slurry containing the same by the steps of filtering, stripping, and drying in a single operation. Another object of this invention is to provide an improved method and apparatus for the recovery of Ziegler-type granular polymers from a slurry of polymer and liquid. It is a further object of this invention to separate Ziegler-type granular polymers from a slurry containing said polymers by filtering, drying, densifying and conveying in a single apparatus as a continuous operation. These and other objects will become apparent from the following description of the invention.

According to the present invention, granular solids, particularly polymers, are recovered in a single operation in a form for ready conveyance from a mixture of granular solids and liquid carrier by sequentially filtering said mixture to separate said solids from said liquid, displacing the adsorbed liquid carrier from the surface of said solids by contact with an inert fluid medium, and drying said solids to remove adsorbed inert fluid medium from the surface of said solids, said filtering, displacing, and drying steps being conducted while simultaneously mechanically agitating said solids to prevent the formation of agglomerates or lumps.

In a specific embodiment of the invention where polyolefin polymers are recovered from a slurry of polyolefins and liquid carrier, the slurry containing the polyolefin is fed to a vessel wherein the liquid medium is removed from the polyolefin material by filtration and steaming, the recovered polyolefin material is dried by removing water through the use of air or vacuum, the polyolefin material is maintained in a granular form by the rotation of an agitator, and thereafter the granulated polyolefin material is conveyed by means of a gas.

The attached drawing depicts the apparatus of this invention and the various attachments which are required to carry out the improved process of this invention. However, the drawing is not to be construed as limiting the apparatus and process to the attachments shown.

In the drawing, the slurry of liquid carrier and polymer is fed into vessel 2 via line 1 until a certain level is reached. The liquid carrier is filtered through the filter medium 3 by the pressure of steam inside the vessel from inlet 5 or by gravity depending on the polymer and liquid carrier present. Liquid drains through line 4 and is recovered while the polymer material remains on the filter medium. Steaming under pressure is continued until all the liquid carrier is steam stripped from the polymer. This steaming operation may be either downflow or upflow depending on the opening used. Throughout the process, the agitator 6 rotates at a very low speed, for instance, 1 to 20 r.p.m., and maintains the polymer mass in a granular condition by impinging lumps of polymer on the baffle rods 7. When the polymer has been completely stripped of liquid carrier and is relatively dry, a vacuum is applied via outlet 8 and water is flashed to decrease the moisture content. A vacuum may be applied above or below the polymer or hot inert gases may be used to dry the polymer. Gas pressure is then directed into the vessel through line 9 and the material is conveyed through line 10 to the next process step where the polymer is further densified and then pelletized.

From the above description, it is apparent that the difficult problems of filtering, stripping, drying and conveying the polymer is conveniently done in a novel operation which is essentially one process step because of the unique process equipment which is used.

This entire process operation is usually carried out at a temperature of about 40° C. to 130° C. although temperature in the range from about 10° C. to about 200° C. can advantageously be employed. A relatively low pressure is generally used to accomplish the results desired. A steam or gas pressure of approximately 5 to 30 p.s.i.g. is preferred although it is possible that pressures in the range from about 1 to about 100 p.s.i.g. or higher can be employed.

The process of this invention is applicable to polymer slurries, and particularly to polyolefin slurries obtained by polymerization of olefins via a suspension type polymerization at high pressures or via the Ziegler or Phillips type polymerization at low pressure. It is particularly applicable to polyolefin slurries obtained using catalysts such as vanadium trichloride, titanium trichloride, titanium tetrabromide and titanium tetrachloride with triethyl-aluminum, diethylaluminum chloride and diisobutyl-aluminum hydride.

The ordinary slurry consisting of liquid carrier and polymer is usually predominately liquid carrier, that is, in the order of 60 to 90 percent by weight liquid and 40 to 10 percent by weight polymer. A weight ratio of 80 percent by weight liquid and 20 percent polymer is commonly employed. However, the process and equipment described in this invention can be successfully employed with any slurry of a content in the range of from 10 to 95 percent liquid carrier.

Although it could be arranged so that the feed of liquid and polymer slurry to a series of vessels would be continuous the operation of each filtering vessel itself must necessarily be a batch operation. This can be clearly seen from the description of the process which requires almost complete removal of the liquid carrier from the polymer, that is, down to a maximum of about 1.0 weight percent carrier. The polymer should contain no more than about 5 to 10 percent water by weight when it is gas conveyed to the next polymer treating operation.

It is important in the steam stripping operation to remove as much of the liquid carrier as possible. The carrier content of the polymer after steam stripping must be less than 1 percent by weight but preferably should be less than 0.1 percent by weight.

The residence time for the above described polymer slurries in the apparatus of this invention is an important process factor but is not a critical factor to the invention. A residence time in the range from about 5 minutes to about 1 hour can be employed in the practice of this process depending on the polymer to be separated and the liquid carrier with which the slurry is composed. To capitalize on the advantages of this process, however, and for economy of operation, it is preferred that the residence time be a minimum. Generally, it can be expected that for olefin polymers a residence time of from about 10 minutes to about 40 minutes will be required to accomplish the desired separation and recovery of the polymer.

Although an inert gas such as nitrogen is preferred to fluidize and convey the granulated polymer, any gas which does not degrade or react with the polymer itself can be employed. For example, air may be used. The pressure which is required to accomplish this step is from about 1 to about 50 p.s.i.g. depending upon moisture content of the polymer cake, the lift and conveying distance required.

Although the conveying steps exemplified in this invention are of the type classed as dense-phase conveying that is, conveying by use of gas pressure, other types of conveying are construed as being within the scope of this invention. An example of such a conveying step would be gas driven booster-jet conveying. If desired the conveying step may be conducted by the application of a vacuum to the polymer outlet line although the use of pressure to fluidize the granulated polymer is preferred.

Any conventional type of filter media can be utilized in the filtration operation of this invention but where processing polyolefin slurries, cloths such as nylon, Dacron and linear polyethylene mono-filament fibers, or other synthetic fibers are particularly desirable, although it is possible to use cotton or other natural fibers in some circumstances. For processes where other polymers are recovered, metal screens such as stainless steel can also be employed. Although only a flat filter is exemplified in the example, any configuration of filter such as cylindrical may be used.

The function of the agitator required when polyolefin slurries are separated in the vessel of this invention is to maintain the polymer in a granular state since polyolefins tend to cake and agglomerate, especially when there are small amounts of liquid carrier present. Therefore, the multi-blade agitator shown in the drawing need rotate only as fast as it is necessary to maintain the polymer in a granular state. This speed can be as slow as 1 r.p.m., in some cases, as fast as 20 r.p.m. The agitator may be of several types as long as it accomplishes the function of dividing the polymer into small particles rather than merely removing polymer from the filter and is not limited to the configuration of the drawing. For instance, an impingement-type agitator or a shear-type agitator may be employed.

Various liquid carriers have been proposed and utilized as suspending media for the polymer catalyst, the more generally used liquid carrier being organic liquids such as hexane. Other organic liquid carriers can suitably be saturated aliphatic, acyclic, and aromatic hydrocarbons, halogenated hydrocarbons and saturated esters. By the way of example may be mentioned liquified propane, isobutane, normal butane, n-haxane, the various isomeric hexanes, cyclohexane, methylcyclopentane, dimethylcyclohexane, dodecane, industrial solvents composed of saturated and/or aromatic hydrocarbons such as kerosenes, naphthas, etc., especially when hydrogenated to remove any olefinic compounds, and especially those ranging in boiling point up to 600° F. Also, benzene, toluene, ethylbenzene, cumene, decalin, and the like may be employed in certain instances. In addition, various other non-organic liquid carriers may be employed.

Likewise, in the quench step in the manufacture of linear polyolefins, various alcohols can be employed to destroy the catalyst so that the polymer may be separated. Any alcohol can be used for this purpose, although alkyl alcohols produce the best results. Alkyl alcohols containing from 1 to 8 carbon atoms are particularly desirable and alkyl alcohols containing from 1 to 4 carbon atoms are preferred. Alcohols that can be used, for example, are methyl alcohols, ethyl alcohol, isopropyl alcohol, n-propyl alcohol, n-butyl alcohol, isobutyl alcohol, tert.-butyl alcohol, amyl alcohol, hexyl alcohol, heptyl alcohol, n-octyl alcohol, isoctyl alcohol, 2-ethylhexyl alcohol, ethylene glycol, triethylene glycol, propylene glycol, benzyl alcohol and methyl phenyl carbinol. While the unsubstituted alcohols are particularly useful, these alcohols can, if desired, be substituted with one or more inert substituents.

Although this process is particularly applicable to the separation of liquid carriers from polyolefins such as polyethylene and polypropylene produced by a high pressure emulsion polymerization or a low pressure Ziegler or Phillips polymerization, the process and equipment disclosed herein can be employed to separate other polymers from aqueous or non aqueous liquid slurries containing the polymers with unusual success. For instance, this process can be of advantage in the recovery of polystyrene, polybutylene, polyisoprene, polyvinyl chloride, polyvinylacetate, polyacetate, and other polymers produced in a slurry or suspension type process, including copolymers such as ethylene-propylene.

The essential steps described in the foregoing specification are easily recognized as feeding a slurry in the apparatus of the invention, filtering the liquid carrier from the solid material, stripping the residual liquid carrier from the solids and drying the solids, densifying and maintaining the solids in a granular state and thereafter conveying the solids to the next process step. It is understood, however, that a number of other operations may be conducted in the apparatus described without departing from the scope of the invention. For instance, some processes may require additional steps such as vacuum flashing or washing and may indeed include quenching of a reaction to form the slurry or perhaps even conducting the reaction or polymerization step itself.

As will be recognized by those skilled in the art, the various process steps described above can be conducted in various modes and manners other than the preferred method recited. For instance, the filtering step can be accomplished either by gravity filtration in some cases or by the preferred application of pressure as exemplified in the example. In addition, the filtering step may involve the sequential separation of the liquid carrier and stripping with an inert gas such as steam or may involve the simultaneous removal of the liquid carrier and replacement with, for instance, steam. The displacement of residual liquid carrier from the polymer might be accomplished either by the preferred use of steam or by an inert gas introduced above or below the filtered polymer as the requirements of the operation might dictate. In the drying step, as has been recited above, the polymer may be reduced in moisture content by the application of vacuum, either above or below the filtered polymer, or by the use of heat, for instance, a hot gas being passed through the polymer.

It has been consistently stated throughout the description of the invention that the material to be processed is a slurry containing solids and a liquid carrier. It is to be understood that the broad definition of slurry includes such terms as suspension and solid-liquid mixtures. The essential consideration is that the material to be treated be of a composition such that the solids are filterable from the liquid carrier. Although it is preferred that the liquid carrier be an organic compound, it is possible that other liquids can contain the slurried solids. For instance, water or other partially aqueous solutions are construed as being within the scope of this invention.

The following example is presented to illustrate the process of the invention but it is not to be construed as limiting it in any manner whatsoever.

EXAMPLE I

Ethylene was polymerized at approximately 100° C. and essentially atmospheric pressure in a slurry catalytic system composed of triethylaluminum and titanium trichloride in a hexane carrier. After the polymerization was complete, the reaction was quenched with methyl alcohol and the total reaction mixture was fed to a rotating disc counter-current extraction column where the catalyst and alcohol was separated from the hexane and solid polyethylene by washing with an aqueous solution of methyl alcohol. The hexane-polyethylene slurry in a weight ratio of 80 to 20 and containing minor amounts of the alcohol and water, was fed to the filtration vessel of this invention. Steam pressure of approximately 10 p.s.i. was applied and the hexane was filtered from the polyethylene and recovered from the bottom of the vessel. At this point, the hexane and water content of the polymer cake was approximately 50%. The remainder of the hexane was steam stripped from the polymer cake with steam entering the bottom of the vessel and flowing through the polymer. The stirrer was turning at approximately 12 r.p.m. during this period and at the end of the steam stripping operation the hexane content of the polymer cake was approximately 0.1% with the water content from 10 to 15% by weight. The steam was shut-off and vacuum was applied to the vessel to reduce the water content of the cake by flashing to approximately 5% by weight. Nitrogen at a pressure of approximately 10 p.s.i. was then applied to the bottom of the vessel whereupon the granulated polymer was fluidized and conveyed out the top of the vessel to a hopper for further processing.

What is claimed is:

1. A process for the recovery in a single operation of a solid polymer in a form for ready conveyance from a slurry of solid polymer and liquid carrier by sequentially filtering said slurry to separate said polymer from said liquid carrier, drying said polymer to remove substantially all said liquid carrier from the surface of said polymer, said filtering and drying steps being conducted in a single vessel while simultaneously mechanically agitating said polymer to prevent the formation of agglomerates and lumps, and thereafter conveying the said granular polymer by the use of a gas.

2. A process for the recovery in a single operation of a solid polymer in a form for ready conveyance from a slurry of solid polymer and liquid carrier by sequentially filtering said slurry to separate said polymer from said liquid carrier, displacing the adsorbed liquid carrier from the surface of said polymer by contact with an inert fluid, drying said polymer to remove substantially all said inert fluid from the surface of said polymer, said filtering, displacing and drying steps being conducted in a single vessel while simultaneously mechanically agitating said polymer to prevent the formation of agglomerates and lumps, and thereafter conveying the said granular polymer by the use of a gas.

3. A method for separating granular solid polymer from a polymer-liquid slurry in a pressure vessel and recovering finely-divided solid polymer in a form for ready conveying, said method comprising, in sequence, introducing said polymer-liquid slurry into said pressure vessel, filtering said polymer-liquid slurry to remove a major portion of said liquid carrier from said polymer, contacting the resulting polymer with a displacing fluid to remove the remaining portion of said liquid carrier from said polymer, drying the resulting polymer, said steps of filtering, contacting and drying being conducted in a single vessel while mechanically agitating said polymer to prevent agglomeration of the same, and removing the resulting polymer from said pressure vessel in a finely-divided form suspended in a gaseous medium.

4. The process of claim 3 wherein the solid polymer is chosen from the group consisting of an olefin homopolymer and an olefin copolymer.

5. The process of claim 4 wherein the solid polymer is produced by a Ziegler-type polymerization.

6. The process of claim 5 wherein the slurry is comprised of from about 60 to about 90% by weight liquid carrier with the remainder being polymer.

7. The process of claim 6 wherein the liquid carrier is an organic liquid and the displacing fluid is steam.

8. The process of claim 7 wherein the liquid carrier content of the polymer is reduced to less than 1% by weight and the water content of the resulting granulated polymer is less than 10% by weight.

9. The process of claim 8 wherein the temperature is in the range from about 10° C. to about 200° C. and the pressure is in the range from about 1 p.s.i.g. to about 100 p.s.i.g.

10. A method for separating solid polymer from a slurry containing said solid polymer and a liquid carrier in a single vessel in a pressure vessel having a filter means therein and recovering said solid polymer in granular form for ready conveying containing less than 1% by weight of said liquid carrier, said method comprising, in sequence, introducing said slurry into said pressure vessel, filtering said slurry through said filter means to remove a major portion of said liquid carrier from said solid polymer, contacting the resulting solid polymer on said filter means with an inert displacing fluid to displace adsorbed liquid carrier from said solid polymer, drying said solid polymer on said filter means to remove adsorbed displacing fluid, said filtering, contacting and drying steps being conducted while said solid polymer is subjected to mechanical agitation sufficient to prevent the formation of agglomerates and lumps, and thereafter removing the resulting solid polymer from the said pressure vessel in a granular form by suspending the same in a gaseous medium.

References Cited by the Examiner

UNITED STATES PATENTS

| | | | |
|---|---|---|---|
| 1,348,159 | 8/1920 | Down | 210—68 |
| 2,404,215 | 7/1946 | Cavanaugh | 210—445 |
| 2,949,447 | 8/1960 | Hawkins et al. | 260—94.9 |
| 3,007,906 | 11/1961 | Linn et al. | 260—94.9 |
| 3,110,707 | 11/1963 | Bua et al. | 260—94.9 |

OTHER REFERENCES

Perry et al., Chemical Engineer's Handbook, 1950, p. 1205.

Perry, Chemical Engineer's Handbook, third edition p. 985.

JOSEPH L. SCHOFER, *Primary Examiner.*

L. EDELMAN, *Assistant Examiner.*